United States Patent
Dominique et al.

(10) Patent No.: US 7,929,510 B2
(45) Date of Patent: Apr. 19, 2011

(54) METHOD OF SCALING SOFT SYMBOLS OF AN UPLINK ENHANCED DEDICATED TRANSPORT CHANNEL (E-DCH) AND METHOD FOR ENABLING USE OF A LOG-MAP TURBO DECODING ALGORITHM FOR PROCESSING THE E-DCH

(75) Inventors: Francis Dominique, Rockaway, NJ (US); Hongwei Kong, Denville, NJ (US); Walid E. Nabhane, Bedminster, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 760 days.

(21) Appl. No.: 11/711,618

(22) Filed: Feb. 28, 2007

(65) Prior Publication Data
US 2008/0205329 A1 Aug. 28, 2008

(51) Int. Cl.
H04B 7/208 (2006.01)

(52) U.S. Cl. ........ 370/342; 370/329; 370/335; 375/262; 375/341; 455/69

(58) Field of Classification Search .......... 375/262, 375/341; 455/69; 370/335, 329
See application file for complete search history.

(56) References Cited

U.S. PATENT DOCUMENTS

| | | | | |
|---|---|---|---|---|
| 7,310,369 | B1 * | 12/2007 | Krieger et al. | 375/227 |
| 2004/0081259 | A1 * | 4/2004 | Ammer et al. | 375/340 |
| 2006/0176867 | A1 * | 8/2006 | Kwak et al. | 370/342 |
| 2008/0159184 | A1 * | 7/2008 | Niwano | 370/278 |

OTHER PUBLICATIONS

3GPP TS25.133V6.0.0 (Dec. 2006), 3GPP Organizational Partners—Sections noted in Office Action.*
3GPP TS25.212V7.3.0 (Dec. 2006), 3GPP Organizational Partners—Sections noted in Office Action.*
3GPP TS25213V7.0.0 (Mar. 2006), 3GPP Organizational Partners—Sections noted in Office Action.*
3GPP TS25214V7.3.0 (Dec. 2006), 3GPP Organizational Partners—Sections noted in Office Action.*
3GPP TS25 321V7.3.0 (Dec. 2006), 3GPP Organizational Partners-Sections noted in Office Action.*
3GPP TS25 309V6.6.0 (Mar. 2006), 3GPP Organizational Partners-Sections noted in Office Action.*

* cited by examiner

*Primary Examiner* — Jinsong Hu
*Assistant Examiner* — William Nealon
(74) *Attorney, Agent, or Firm* — Harness, Dickey & Pierce (57) ABSTRACT

A method of scaling soft symbols of an uplink E-DCH is provided, where the E-DCH is received from a user in a network for processing in a base station receiver in the network employing a log-MAP turbo decoding algorithm to process the E-DCH. The E-DCH includes an E-DPDCH from which the soft symbols are generated at the base station receiver, and an E-DPCCH used to transmit control information associated with the E-DPDCH, which along with configuration information from a radio network controller (RNC) of the network enables the base station receiver to determine a reference amplitude ratio linked to the actual power offset of the E-DPDCH from the legacy DPCCH. In the method, an estimated E-DPDCH to DPCCH amplitude ratio that represents a scaling factor for the soft symbols is determined, and the soft symbols are scaled by the scaling factor to enable the soft symbols to be processed by the log-MAP turbo decoding algorithm in the base station receiver.

12 Claims, 7 Drawing Sheets

METHOD OF SCALING SOFT SYMBOLS OF AN UPLINK ENHANCED DEDICATED TRANSPORT CHANNEL (E-DCH) AND METHOD FOR ENABLING USE OF A LOG-MAP TURBO DECODING ALGORITHM FOR PROCESSING THE E-DCH

CROSS-REFERENCE TO RELATED APPLICATION

This application is related to co-pending U.S. patent application Ser. No. 11/711,613, filed Feb. 28, 2007 to Dominique et al. and entitled "METHOD OF SCALING SOFT SYMBOLS OF AN UPLINK ENHANCED DEDICATED TRANSPORT CHANNEL (E-DCH) AND METHOD FOR ENABLING USE OF A LOG-MAP TURBO DECODING ALGORITHM FOR PROCESSING THE E-DCH", the entire contents of which is hereby incorporated by reference herein.

BACKGROUND OF THE INVENTION

1. Field of the Invention

Example embodiments relate generally to a method of scaling soft symbols of an uplink enhanced dedicated transport channel (E-DCH), and to a method for enabling use of a log-MAP turbo decoding algorithm for processing the E-DCH.

2. Description of the Related Art

A cellular communications network typically includes a variety of communication nodes coupled by wireless or wired connections and accessed through different types of communications channels. Each of the communication nodes includes a protocol stack that processes the data transmitted and received over the communications channels. Depending on the type of communications system, the operation and configuration of the various communication nodes can differ and are often referred to by different names. Such communications systems include, for example, a Code Division Multiple Access 2000 (CDMA2000) system and a Universal Mobile Telecommunications System (UMTS).

Third generation wireless communication protocol standards (e.g., 3GPP-UMTS, 3GPP2-CDMA2000, etc.) employ a dedicated channel (DCH) in the uplink (e.g., a communication flow between a mobile station or User Equipment (UE), also referred to as a user, and a base station (BS) or NodeB). The DCH is an uplink transport channel and is transmitted by the user over the entire cell the user is in (or over only a part of the cell) using e.g. beam-forming antennas. The DCH include a data part (e.g., a dedicated physical data channel (DPDCH) in accordance with UMTS Release 99/4/5 protocols and a control part (e.g., a dedicated physical control channel (DPCCH). A user in accordance with UMTS Release 99/4/5 protocols, a pilot/power control sub-channel in accordance with CDMA2000 protocols, etc.). Users of the DCH in accordance with these older Release 99/4/5 protocols may be understood as legacy users, with the DCH representing a legacy dedicated transport channel having a legacy DPDCH and legacy DPCCH.

Newer versions of these standards such as Release 6 of UMTS provide for high data rate uplink channels referred to as enhanced dedicated channels (E-DCHs). An E-DCH includes an enhanced data part (e.g., an E-DCH dedicated physical data channel (E-DPDCH) and an enhanced control part (e.g., an E-DCH dedicated physical control channel (E-DPCCH) in accordance with UMTS protocols.

Figure 1:
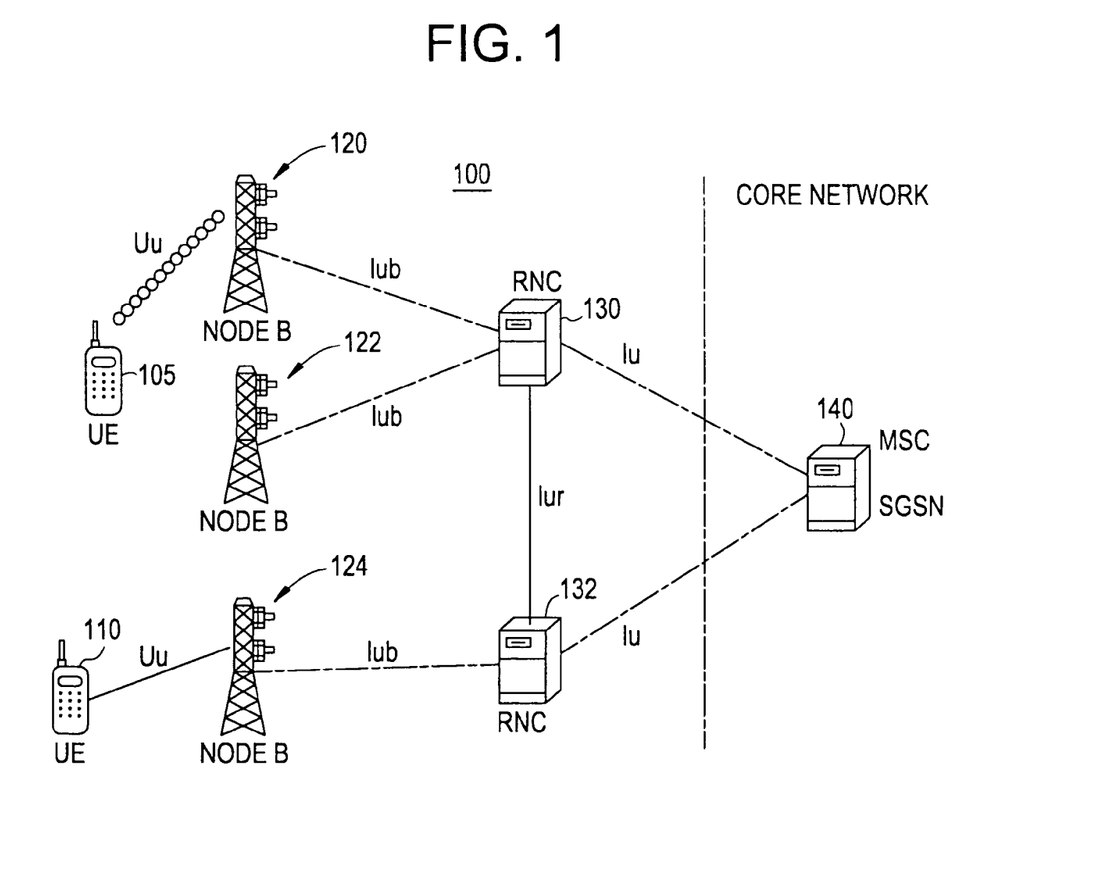
FIG. 1 illustrates a conventional wireless communication system 100 operating in accordance with UMTS protocols.

FIG. 1 illustrates a conventional wireless communication system 100 operating in accordance with UMTS protocols. Referring to FIG. 1, the wireless communication system 100 includes a number of NodeBs such as NodeBs 120, 122 and 124, each serving the communication needs of a first type of user 110 and a second type of user 105 in their respective coverage area or cell. The first type of user 110 may be a higher data rate user such as a UMTS Release 6 user, or enhanced user. The second type of user is a lower data rate user such as a UMTS Release 4/5 user, or legacy user. The NodeBs 120, 122, 124 are connected to a radio network controller (RNC) such as RNCs 130 and 132, and the RNCs 130/132 in turn are connected to a MSC/SGSN 140. The RNC 130/132 handles certain call and data handling functions such as autonomously managing handovers without involving MSCs and SGSNs. The MSC/SGSN 140 handles routing calls and/or data to other elements (e.g., RNCs 130/132 and NodeBs 120/122/124) in the network or to an external network. Further illustrated in FIG. 1 are interfaces Uu, Iub, Iur and Iub between these elements.

Figure 2A:
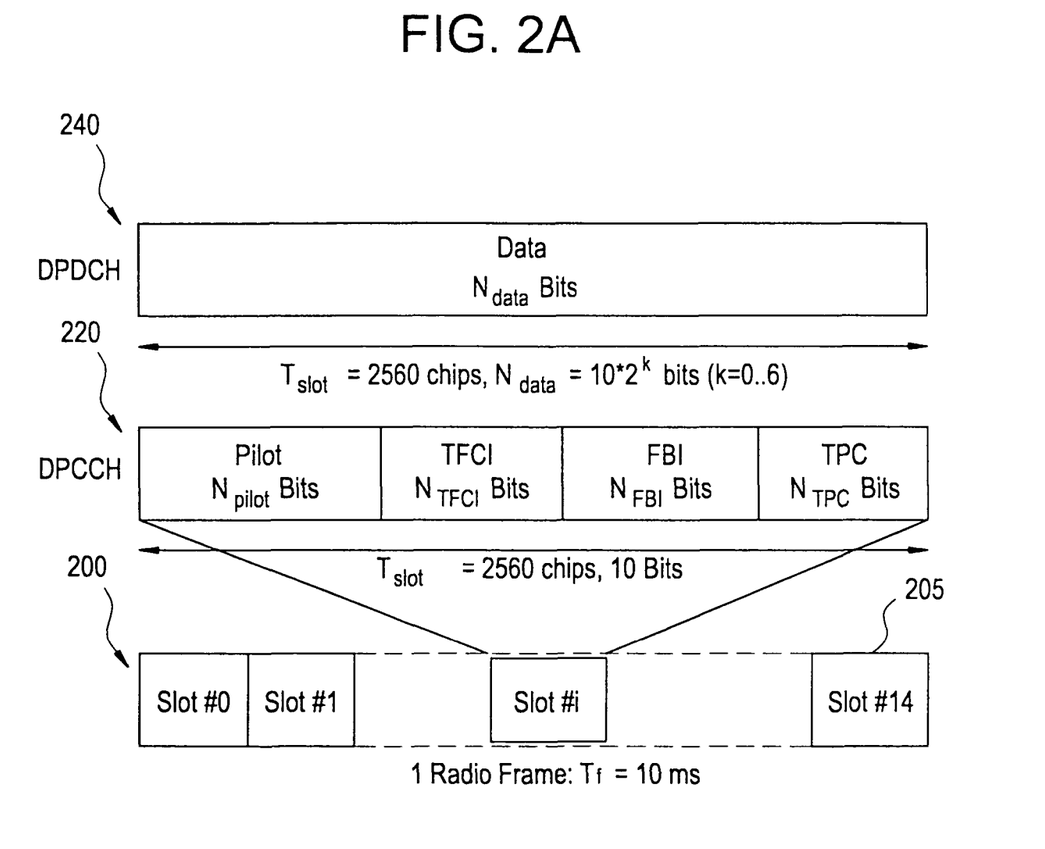
FIG. 2A is a frame structure of a legacy DCH.

FIG. 2A is a frame structure of a legacy dedicated transport channel (DCH) for data transmission in the uplink from users to the base station (or Node-B). As is known, the legacy DPCCH and DPDCH which constitute the legacy DCH are code multiplexed and combined for transmission to a Node-B (such as Node-130 in FIG. 1). As shown in FIG. 2A, the DPCCH 220 includes 15 slots 205 per radio frame 200 (i.e., processing duration corresponding to 15 slots, where the length of the frame is 38,400 chips). One radio frame 200 is 10 ms in duration; thus each slot 205 is 0.667 ms in duration.

The uplink DPDCH 240 carries the data from the user, such as speech traffic for example. The uplink DPCCH 220 is be used to carry control information generated at Layer 1 (the physical layer). Layer 1 control information includes known pilot bits to support channel estimation for coherent detection, transmit power-control (TPC) commands, feedback information (FBI), and an optional transport-format combination indicator (TFCI). The TFCI informs the receiver at the Node B about the instantaneous transport format combination of the transport channels mapped to the simultaneously transmitted uplink DPDCH radio frame.

Within each slot 205, the user thus transmits pilot bits and certain control bits such as TFCI, FBI and TPC bits. Each slot 205 has a total of ten (10) combined pilot bits and control bits. The actual combinations of bit numbers may change and may be controlled by the RNC 130/132 at the network, for example. An example configuration may be 5 pilot bits, 2 TFCI bits, 1 FBI bits and 2 TPC bits for one slot.

The pilot bits are known to both the Node-B and the user (such as legacy UEs 105); the remaining control bits (TPC, FBI and TFCI) are not known to the base station (Node-B 130). The number of TPC bits per slot is typically either 1 or 2 bits. If there are two TPC bits in one slot, the values of the 2 bits are identical, i.e., either both TPC bits are 0 or both bits are 1.

Figure 2B:
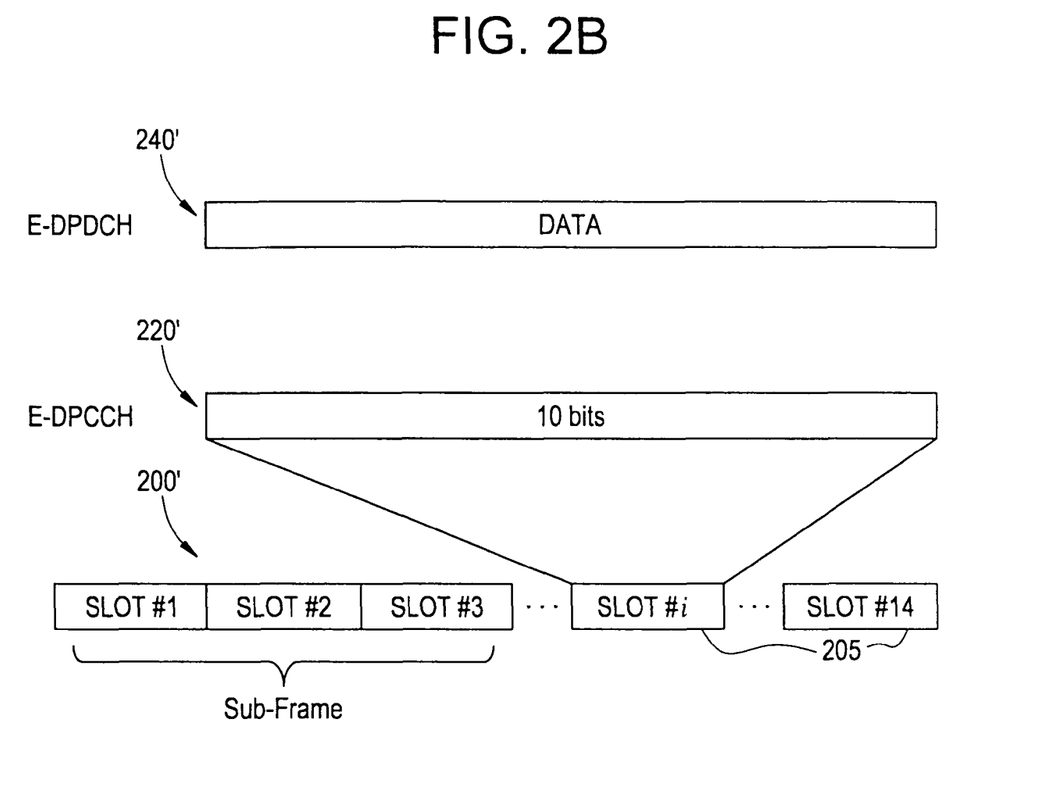
FIG. 2B is a frame structure of an E-DCH.

FIG. 2B shows the frame structure for the E-DCH (e.g., E-DPCCH and E-DPDCH) in the uplink. Each frame 200' has a length of 10 milliseconds (ms) and is partitioned into 5 sub-frames each including 3 slots. Each slot 205' has a length of 2560 chips, and has a duration of 0.667 ms. Consequently, each sub-frame has a duration of 2 ms.

As discussed above, an E-DCH includes an E-DPDCH 240' and an E-DPCCH 220', and each of the E-DPDCH 220' and the E-DPDCH 240' are code multiplexed (combined) for transmission. The E-DPCCH 220' carries control information for an associated E-DPDCH 240'. This control information includes three components: a re-transmission sequence number (RSN), a transport format indicator (TFI) and a happy bit. The RSN indicates the transmission index of an associated packet transmitted on the E-DPDCH, has a maximum value of 3 and is represented by two bits. The TFI indicates the data format for the transport channel carried by the associated E-DPDCH (e.g., transport block size, transmission time interval (TTI), etc.) and is represented by 7 bits. The happy bit is a binary indicator, which may be used by a user (i.e., UE 110 of FIG. 1) to inform one or more NodeBs whether the user is satisfied with the current setup of the E-DCH channels and is represented by a single bit. For example, UE 110 of FIG. 1 may use this indicator to inform one of the NodeBs 120/122/124 that the UE 110 may handle greater data capacity. In other words, the happy bit is a rate increase request bit.

Third generation wireless standards (3GPP) have adopted turbo code for E-DCH data transmission on the uplink, due to its superior error correcting capabilities. The core of the turbo decoder in the Node-B receiver for decoding the received E-DCH is the a posteriori probability calculator, where the a posteriori probabilities are calculated for all systematic bits, which are the original un-coded UE data bits that need to be transmitted on the E-DPDCH.

There are two widely used algorithms for the a posteriori probability calculation, namely, the log-MAP (maximum a posteriori probability) algorithm and the Max-log-MAP algorithm. The Max-log-MAP algorithm does not require soft symbol scaling, while the log-MAP algorithm does. Therefore, the Max-log-MAP algorithm is simpler to implement, but at the price of reducing signal to noise ratio (Eb/No) performance, which can be as high as a 0.4 dB for the turbo code used in 3GPP legacy DCH and the new E-DCH.

The scaling factor used to scale the soft symbols generated from the received data channel is a constant. This constant is proportional to the amplitude ratio (which is the square-root of the power ratio) of that data channel to the DPCCH used in channel estimation for the DCH code blocks. For a legacy data channel (DPDCH), the amplitude ratio of the DPDCH to DPCCH can be derived from the TFCI bits transmitted in the DPCCH, so the NodeB knows this ratio exactly if it can decode the TFCI information. Therefore, the log-MAP algorithm can be used in the turbo decoder of the NodeB receiver for the legacy DCH to achieve optimal performance.

However, for the uplink E-DCH, the E-DPDCH to DPCCH amplitude ratio is not known to the NodeB exactly. There is only one transport channel per user for E-DCH. The transport channel carries the MAC-e packet. A MAC-e packet is formed by multiplexing multiple MAC-d flows. Each MAC-d flow has its own HARQ (hybrid ARQ) profile, which specifies the expected E-DCH to DPCCH amplitude ratio offset from a reference amplitude ratio. The offset is always positive in terms of dB value and can be as large as 6 dB. When multiple MAC-d flows are multiplexed to form one MAC-e packet, the maximum of all the amplitude ratio offsets is used to set the final E-DPDCH to DPCCH amplitude ratio. Since the NodeB does not know the composition of the MAC-e packet until after the E-DPDCH packet is decoded, the exact amplitude ratio of E-DPDCH to DPCCH is not available for the scaling of the E-DPDCH soft symbols. Accordingly, for the uplink E-DCH, the Max-log-MAP algorithm is suggested by 3GPP due to this lack of knowledge on the exact amplitude ratio, however at the expense of degraded performance of up to 0.4 dB.

Figure 3:
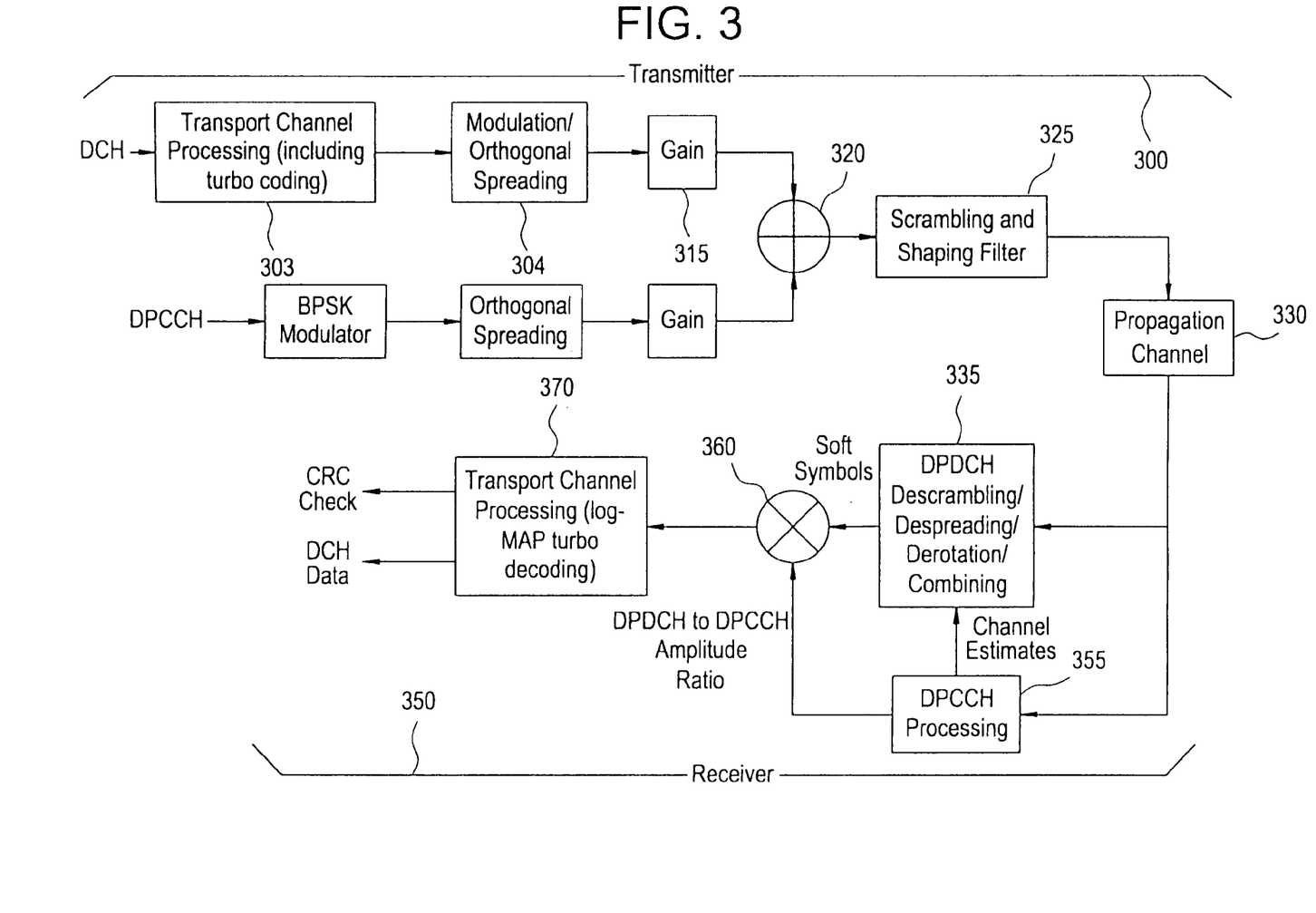
FIG. 3 is a block diagram of a conventional uplink transmitter/receiver relationship for transmission/reception of a legacy DCH frame.

FIG. 3 illustrates a conventional UMTS uplink transmitter 300 located at the enhanced UE 110 of FIG. 1 and a receiver 350 located at one of the NodeBs 120/122/124. The conventional transmitter 300 and receiver 350 of FIG. 3 may transmit and receive E-DCHs. FIG. 3 is provided to illustrate the legacy DCH processing using turbo code, with only one transport channel. The units or blocks described in FIG. 3 can be implemented in hardware, such as in ASICs on the respective transmitter board of the UE 110 or receiver board at a NodeB, 120/122/124, in (software—algorithms implemented by a microprocessor at the UE 110/NodeB 120/122/124), or combinations of hardware and software, for example.

At the transmitter 300, there are two code channels present, the DPDCH (for DCH) and the DPCCH. The DPCCH carries the pilot symbols, to be used for channel estimation at the NodeB receiver 350, and TFCI bits, to be used to derive the DPDCH to DPCCH amplitude ratio at the NodeB receiver 350. Both channels are modulated by BPSK modulators and spread by their corresponding Walsh codes and gain-adjusted before combined (code-division and/or I/Q multiplexed).

For example, for the DPDCH, the data associated with the upper layer legacy DCH) is processed (and encoded with turbo coding) into DPDCH frames at the transmission channel processing block 303. The frames are binary phase shift keying (BPSK) modulated and orthogonally spread at the modulation and orthogonal spreading unit 304. The spread modulated frames are received by the gain unit 315 where an amplitude of the spread modulated frames are adjusted. Similarly for the DPCCH, DPCCH frames used in determining channel estimates for the propagation channel, as is known, are modulated at a BPSK Modulator 306, and the modulated frames are orthogonally spread at an orthogonal spreading unit 311. The spread modulated frames are received by a gain unit 317 where an amplitude of the spread modulated frames are adjusted.

The outputs of each of the gain units 315 and 317 are combined (e.g., code-division multiplexed) into a combined signal by a combiner unit 320. The combined signal is scrambled and filtered by a shaping filter 325, and the output of the shaping filter 325 is sent to the receiver 350 via a propagation channel 330 (e.g., over the air).

Of note, not all of the transport processing to recover the DCH data is shown at the NodeB receiver 350 for purposes of brevity. At the receiver 350, the transmitted signal is received over the propagation channel 330, and input to the DPDCH processing block 335 and a DPCCH channel estimation block 355. As is well-known in the art, pilot signals embedded in the DPCCH are used to estimate the propagation channel 330. The DPCCH channel estimation block 355 thus generates channel estimates using pilots transmitted on the DPCCH. The channel estimates are generated in any well-known manner, and will not be discussed further herein for the sake of brevity. The channel estimates generated in the DPCCH channel estimation block 355 are output to the DPDCH processing block 335 and used for de-rotation.

Within DPDCH processing block 335, the following functions occur. The transmitted signal received over propagation channel 330 is de-scrambled and de-spread to generate DPDCH symbols. The DPDCH symbols are then de-rotated by the channel estimates from the DPCCH channel estimation block 355 and combined over multiple paths to generate a sequence of soft-symbols.

As discussed above, the scaling factor used to scale the soft symbols generated from the received DPDCH (at multiplier 360) is a constant that is proportional to the DPDCH to DPCCH amplitude ratio. The DPDCH to DPCCH amplitude ratio information to be used is derived from the TFCI bits embedded in the DPCCH, and the scalar is calculated from the DPDCH to DPCCH amplitude ratio to scale the soft symbols. The scalar is essentially equal to this amplitude ratio.

The scaled soft symbols are processed by a transport channel processing block 370 in the receiver 350. A detailed discussion of transport channel processing at block 370 to recover the DCH data is omitted as this is well known and not a focus herein. However, a Turbo decoder using the log-MAP algorithm is part of the transport channel processing for a DCH.

Figure 4:
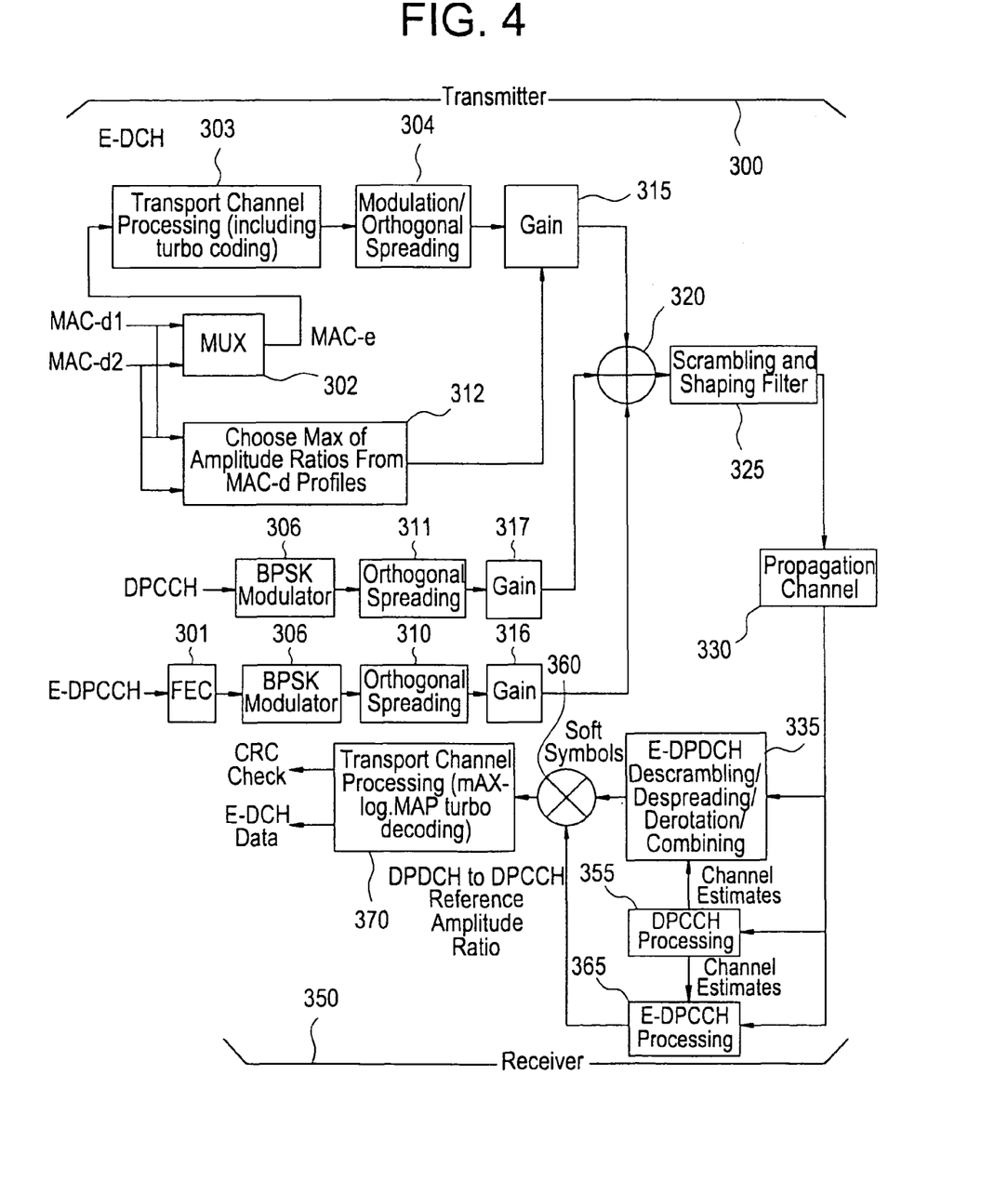
FIG. 4 is a block diagram of a conventional uplink transmitter/receiver relationship for transmission/reception of an E-DCH frame.

FIG. 4 illustrates the conventional transmitter 300 and receiver 350 of FIG. 3 configured to transmit and receive E-DCHs. Only the differences from FIG. 3 are explained in detail in FIG. 4 for purposes of brevity. FIG. 3 is provided to illustrate E-DCH processing using turbo code.

Referring to FIG. 4, for E-DCH the processing is different from amplitude ratio handling point of view. There is only one transport channel per E-DCH. For E-DPCCH coding, the 2 RSN bits, the 7 TFI bits and the 1 happy bit are mapped into a 10-bit E-DPCCH word, which is control information for an associated E-DPDCH frame having a TTI of, for example, 2 ms or 10 ms. The E-DPCCH word is coded into a 30-bit coded sequence at an FEC unit 301. That is, for example, the 10-bit E-DPCCH word associated with a single E-DPDCH frame is first coded into a 32-bit E-DPCCH codeword using a (32, 10) sub-code of the second order Reed-Muller code. The 32-bit codeword is then punctured to (30, 10) code to generate the 30 coded symbols (in this case 1 bit will represent 1 symbol) to be transmitted. These 30 coded symbols are transmitted in one sub-frame (e.g., 3 slots with 10-bits per slot).

The coded sequence is modulated at BPSK Modulator 305 and orthogonally spread at an orthogonal spreading unit 310. The output from the orthogonal spreading unit 310 is gain adjusted at a gain unit 316 and output to the combiner 320. As discussed in FIG. 3, well-known DPCCH frames used in determining, for example, channel estimates, are modulated at a BPSK Modulator 306, and the modulated frames are orthogonally spread at an orthogonal spreading unit 311. The spread modulated frames are received by a gain unit 317 where an amplitude of the spread modulated frames are adjusted, as previously discussed.

Additionally, and unlike the legacy DCH, the transport channel (E-DCH) carries a MAC-e packet. The MAC-e packet is formed by multiplexing multiple MAC-d flows at MUX 302. Processing of the MAC-e packet at units 303, 304 and 315 to formulate the E-DPDCH frame is the same as described in FIG. 3.

In an example, each MAC-d flow can be understood as a particular application to be run on the UE 110, and thus the MAC-e packet contains data for a plurality of applications. Each MAC-d flow has its own HARQ (hybrid ARQ) profile, which specifies an expected E-DPDCH to DPCCH amplitude ratio offset from a reference E-DPDCH to DPCCH amplitude ratio. The reference E-DPDCH to DPCCH amplitude ratio can be determined at the base station receiver from the control information decoded from the E-DPCCH together with knowledge of the configuration information from the RNC.

The offset from the reference to expected amplitude ratios is always positive in terms of dB value and can be as large as 6 dB. When multiple MAC-d flows are multiplexed to form one MAC-e packet, the maximum of all the amplitude ratio offsets (determined at block 312) is used to set the final E-DPDCH to DPCCH amplitude ratio, which is the output of block 312 as serves as an input to gain unit 315. Since the NodeB receiver 350 does not know the composition of the MAC-e packet until after the E-DPDCH packet is decoded, the exact amplitude ratio of E-DPDCH to DPCCH is not available for the scaling of the E-DPDCH soft symbols at multiplier 360.

The outputs of each of the gain units 315, 316 and 317 are code-division multiplexed at combiner unit 320, then scrambled and filtered by a shaping filter 325 for output to the NodeB receiver 350 via a propagation channel 330 (e.g., over the air). At the receiver 350, the transmitted signal is received over the propagation channel 330, and input to the DPDCH processing block 335 and a DPCCH channel estimation block 355, and E-DPCCH processing block 365. The DPCCH channel estimation block 355 generates the channel estimates used by the E-DPDCH processing block 335 as described above in order to generate the soft symbols. The channel estimates from DPCCH channel estimation block 355 are also input to E-DPCCH processing block 365. In the E-DPCCH processing block 365, the received E-DPCCH signal is de-scrambled and de-spread to generate the E-DPCCH symbols. The E-DPCCH symbols are then de-rotated by the channel estimates and combined over multiple paths to form a sequence of E-DPCCH soft symbols, which are then decoded appropriately to recover control information such as the RSN, TFI and Happy Bit. The E-DPCCH processing block 365 uses the decoded TFI information from the E-DPCCH signal, along with configuration information from the RNC (such as RNC 130 or 132 in FIG. 1) to generate a reference E-DPDCH to DPCCH amplitude ratio.

As discussed above, the NodeB receiver 350 does not know the composition of the MAC-e packet until after the E-DPDCH packet is decoded, thus the exact amplitude ratio of E-DPDCH to DPCCH is not available for the scaling of the E-DPDCH soft symbols at multiplier 360. Therefore, since the exact E-DPDCH to DPCCH amplitude ratio cannot be determined at the NodeB receiver 350 for processing an E-DCH, 3GPP recommends that the NodeB receiver 350 scale the signal using the reference E-DPDCH to DPCCH amplitude ratio carried by the E-DPCCH and using the Max-log-MAP algorithm (instead of the log-MAP algorithm) in the turbo decoder. However, the tradeoff in using the reference E-DPDCH to DPCCH amplitude ratio to scale the E-DPDCH soft symbols for processing using the Max-log-MAP algorithm at block 370 in the NodeB receiver 350 is a performance loss of about 0.4 dB for E-DCH.

SUMMARY OF THE INVENTION

An example embodiment is directed to a method of scaling soft symbols of an uplink E-DCH received from a user in a network for processing in a base station receiver in the network employing a log-MAP turbo decoding algorithm to process the E-DCH. The E-DCH includes an E-DPDCH from which the soft symbols are generated at the base station receiver, and an E-DPCCH used to transmit control information associated with the E-DPDCH, which along with configuration information from a radio network controller (RNC) of the network enables the base station receiver to determine a reference amplitude ratio linked to the actual power offset of the E-DPDCH from the legacy DPCCH. In the method, an estimated E-DPDCH to DPCCH amplitude ratio that represents a scaling factor for the soft symbols is determined, and the soft symbols are scaled by the scaling factor to enable the soft symbols to be processed by the log-MAP turbo decoding algorithm in the base station receiver.

Another example embodiment is directed to a method of enabling use of a log-MAP turbo decoding algorithm in a base station receiver within a network for processing an E-DCH received from a user in the network, where the E-DCH includes an E-DPDCH from which the soft symbols are generated at the base station receiver, and an E-DPCCH used to transmit control information associated with the E-DPDCH, which along with configuration information from a radio network controller (RNC) of the network enables the base station receiver to determine a reference amplitude ratio linked to the actual power offset of the E-DPDCH from the legacy DPCCH. The method includes determining an estimated E-DPDCH to DPCCH amplitude ratio, and multiplying the soft symbols by the estimated amplitude ratio to enable the soft symbols of the E-DPDCH to be processed by the log-MAP turbo decoding algorithm in the base station receiver.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the example embodiments of the present invention.

DETAILED DESCRIPTION OF THE EXAMPLE EMBODIMENTS

As used herein, the term user may be synonymous with user equipment (UE) mobile, mobile station, mobile user, subscriber, wireless terminal, access terminal and/or remote station, etc., for example, and may describe a remote user of wireless resources in a wireless communication network. Where used below, the term Node-B is synonymous with a base transceiver station, base station, access point, etc. and may describe equipment that provides voice and/or data connectivity between a communication network and one or more mobile stations. Occasionally herein the terms Node-B and base station are used interchangeably.

Figure 5:
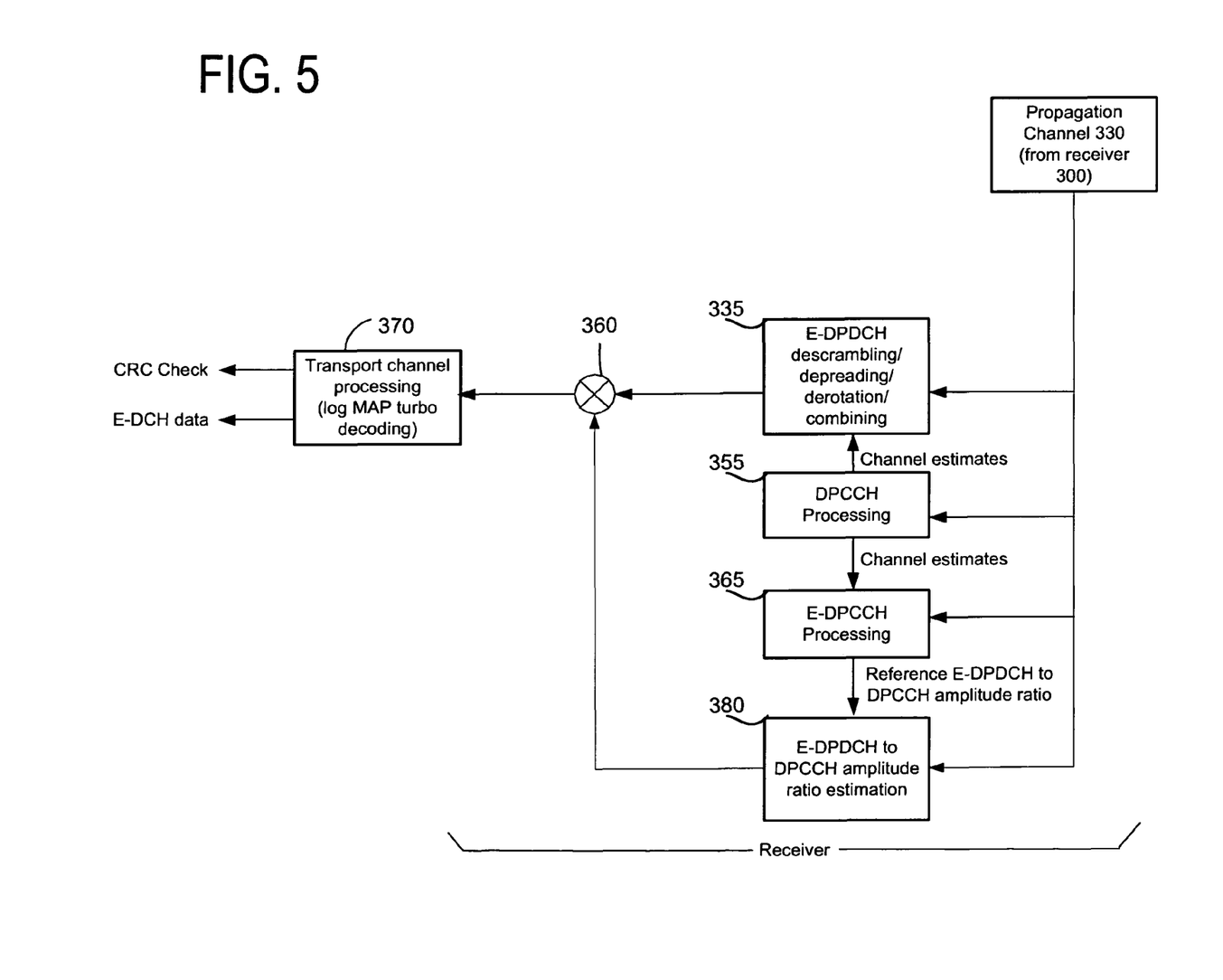
FIG. 5 is a block diagram of an uplink transmitter/receiver relationship for transmission/reception of an E-DCH frame using an estimated E-DPDCH to DPCCH amplitude ratio.

FIG. 5 is a block diagram of an uplink transmitter/receiver relationship for transmission/reception of an E-DCH frame using an estimated E-DPDCH to DPCCH amplitude ratio. As previously discussed, using the reference E-DCH to DPCCH amplitude ratio to scale the E-DPCCH soft symbols can result in under-scaling of the soft-symbols by as much as 6 dB. This is catastrophic if the turbo decoder at the NodeB receiver 350 uses the log-MAP algorithm, because the log-MAP algorithm is extremely sensitive to under-scaling. Therefore the Max-log-MAP algorithm is currently recommended for the turbo decoder by 3GPP. There is a 0.4 dB performance loss compared with turbo decoder using the log-MAP algorithm, but it is completely immune to soft symbol scaling errors.

In accordance with the example embodiments, the inventors propose an alternative which allows the use of log-MAP algorithm in the turbo decoder for processing an E-DCH, and with no loss in performance. As shown in FIG. 5, and compared with FIG. 4, there are two differences. The first is that the log-MAP algorithm is used in the turbo decoder; and the second is that the E-DPDCH soft symbols scaling factor is estimated by the "E-DCH to DPCCH amplitude ratio estimation" block 380. The E-DCH to DPCCH amplitude ratio estimation block determines an E-DCH to DPCCH amplitude ratio based in part on the reference E-DPDCH to DPCCH amplitude ratio, which serves as an input from E-DPCCH processing block 365.

Figure 6:
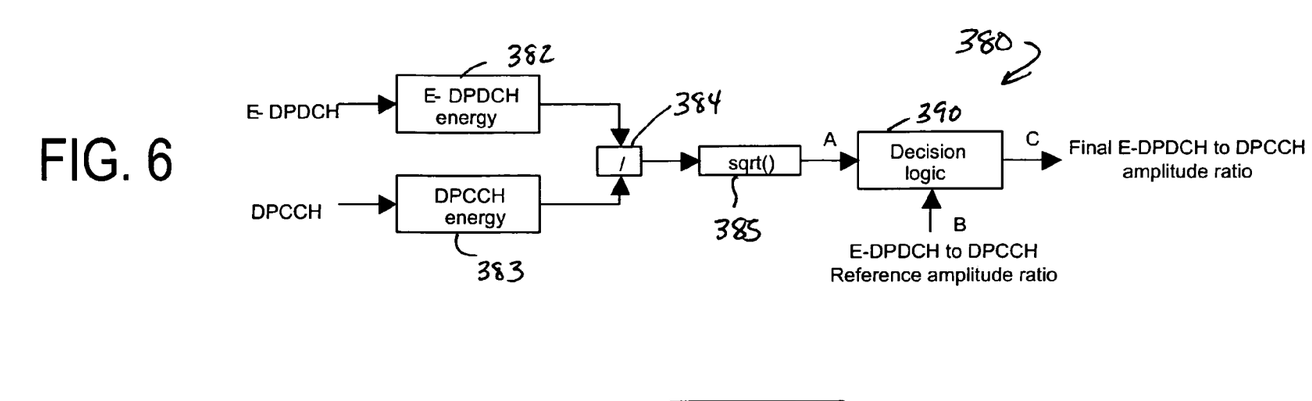
FIG. 6 is a block diagram to illustrate a function of estimating a E-DPDCH to DPCCH amplitude ratio for use in a method of scaling soft symbols and/or a method of enabling the use of a log-MAP turbo decoding algorithm in the NodeB receiver 350 for processing the E-DCH.

FIG. 6 is a block diagram to illustrate a function of estimating a E-DPDCH to DPCCH amplitude ratio for use in a method of scaling soft symbols and/or a method of enabling the use of a log-MAP turbo decoding algorithm in the NodeB receiver 350 for processing the E-DCH. In FIG. 6, the blocks and/or processes shown can be understand as functions of a software routine or algorithm implemented at NodeB receiver 350 as part of the E-DCH processing.

Referring to FIG. 6, at the NodeB receiver 350, E-DPDCH energy and DPCCH energy blocks 382, 383 calculate the energies for both channels. The energy calculation can be implemented using well-known methods (such as square-sum-accumulate-over-fingers). The square root 385 of the ratio 384 of the two outputs provides a preliminary or initial amplitude ratio estimate (denoted as 'A' in FIG. 6. The initial amplitude ratio estimate is then processed in at a decision logic block 390 together with the E-DCH to DPCCH reference amplitude ratio (shown as "B") obtained from the E-DPCCH processing to give the final E-DCH to DPCCH amplitude ratio to be used for scaling the soft symbols. The scalar is effectively equal to this final amplitude ratio.

Accordingly, the functionality in the block diagrams of FIGS. 5 and 6 illustrate a method of scaling soft symbols of an uplink E-DCH received from a user, such as UE 110, for processing in the NodeB receiver 350 employing a log-MAP turbo decoding algorithm to process the E-DCH. As shown, an estimated E-DPDCH to DPCCH amplitude ratio that represents a scaling factor for the soft symbols is first determined at block 380, and then the soft symbols are scaled by the scaling factor at 360 to enable the soft symbols to be processed by the log-MAP turbo decoding algorithm at block 370 in the NodeB receiver 350.

Alternatively or in addition, the functionality in the block diagrams of FIGS. 5 and 6 illustrate a method of enabling use of a log-MAP turbo decoding algorithm in the NodeB receiver 350 for processing the E-DCH received from UE 110, for example, where the E-DCH includes an E-DPDCH from which the soft symbols are generated (at block 335) at the NodeB receiver 350, and an E-DPCCH used to transmit control information associated with the E-DPDCH which along with configuration information from the RNC enables the NodeB to determine a reference amplitude ratio linked to the actual power offset of the E-DPDCH from the legacy DPCCH. The method includes determining the estimated E-DPDCH to DPCCH amplitude ratio at block 380, and multiplying the soft symbols by the estimated amplitude ratio at multiplier 360 to enable the soft symbols of the E-DPDCH to be processed by the log-MAP turbo decoding algorithm at block 370 in the NodeB receiver 350.

Figure 7:
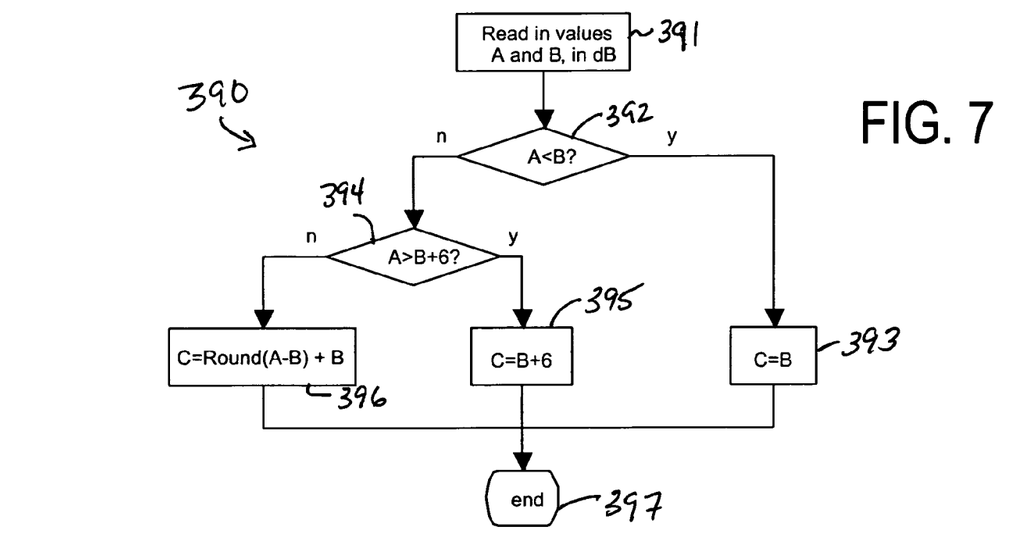
FIG. 7 is a block diagram that further illustrates the decision logic of FIG. 6.

FIG. 7 is a block diagram that further illustrates the decision logic of FIG. 6 in further detail. The initial (A) and reference (B) amplitude ratios are in dB values. Thus, the functionality evaluates the initial estimated ratio against the reference amplitude ratio, which are read in by the decision logic block 390 at 391. If the processing determines that the initial estimated amplitude ratio is less than the reference amplitude ratio (A<B), output of 392 is 'YES', the final estimated amplitude ratio to be used as the scaling factor is set (393) to the value of the reference amplitude ratio, and decision logic processing ends (397).

However, if the initial estimated amplitude ratio is greater than the reference amplitude ratio (A>B, or output of 392 is YES), it is then compared to a larger number—the reference amplitude ratio plus a specified maximum offset (B+6). In other words, the maximum amplitude ratio can be no more than the reference amplitude ratio+6. By the current standard, the maximum offset is 6 dB, however this number is only an example and could change in later revisions to the standard. If the initial estimated amplitude ratio is greater than the reference amplitude ratio plus the specified max offset (output of 395 is 'YES'), the final estimated amplitude ratio is set (395) to the value of the reference amplitude ratio plus the offset, and decision logic processing ends (397).

Otherwise, with A<B+6 (output of 394 is 'NO'), the final estimated amplitude ratio is set to a value equal to a difference between the initial and reference amplitude ratios, rounded up to the next highest integer value, plus the value of the reference amplitude ratio. This is shown in FIG. 7 at 396 as C=Round(A−B)+B.

The proposed example methodology may make it possible to achieve performance offered by the log-MAP algorithm for processing an E-DCH with some slight complexity increase. Additionally the proposed method may provide backwards compatability, as many commercially available turbo decoders implement only the log-MAP algorithm; thus the proposed methodology offers a designer more flexibility in choosing devices and, if devices already chosen, a way of backward compatibility.

The example embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

What is claimed is:

1. A method of scaling soft symbols of an uplink Enhanced Dedicated transport Channel (E-DCH) received from a user in a network for processing in a base station receiver in the network employing a log-MAP turbo decoding algorithm to process the E-DCH, the E-DCH having an Enhanced Dedicated Physical Data Channel (E-DPDCH) from which the soft symbols are generated at the base station receiver, and an Enhanced Dedicated Physical Control Channel (E-DPCCH) used to transmit control information associated with the E-DPDCH, which along with configuration information from a radio network controller (RNC) enables the base station receiver to determine a reference amplitude ratio linked to the actual power offset of the E-DPDCH from a legacy DPCCH, the method comprising:

determining an estimated E-DPDCH to DPCCH amplitude ratio that represents a scaling factor for the soft symbols, and scaling the soft symbols by the scaling factor to enable the soft symbols to be processed by the log-MAP turbo decoding algorithm in the base station receiver.

2. The method of claim 1, wherein determining the estimated amplitude ratio further includes determining an initial estimated E-DPDCH to DPCCH amplitude ratio, and evaluating the initial estimated E-DPDCH to DPCCH amplitude ratio against a reference E-DPDCH to DPCCH amplitude ratio to determine a final estimated E-DPDCH to DPCCH amplitude ratio to be used as the scaling factor for the soft symbols.

3. The method of claim 2, wherein determining the initial estimated amplitude ratio further includes:

calculating a first energy value of the E-DPDCH, calculating a second energy value of the DPCCH, dividing the first energy value by the second energy value to obtain an amplitude ratio, and determining the square root of the amplitude ratio for output as the initial estimated amplitude ratio.

4. The method of claim 2, wherein the initial and reference amplitude ratios are in dB, and evaluating the initial estimated ratio against the reference amplitude ratio further includes setting the final estimated amplitude ratio to be used as the scaling factor to the value of the reference amplitude ratio, if the initial estimated amplitude ratio is less than the reference amplitude ratio.

5. The method of claim 2, wherein the initial and reference amplitude ratios are in dB, and evaluating the initial estimated ratio against the reference amplitude ratio further includes determining if the initial estimated amplitude ratio is greater than the reference amplitude ratio plus a specified maximum offset, and if so setting the final estimated amplitude ratio to the value of the reference amplitude ratio plus the offset, else setting the final estimated amplitude ratio to a value equal to a difference between the initial estimated and reference amplitude ratios, rounded up to the next highest integer value, plus the value of the reference amplitude ratio.

6. The method of claim 2, wherein the reference E-DPDCH to DPCCH amplitude ratio is carried by the E-DPCCH.

7. A method for enabling use of a log-MAP turbo decoding algorithm in a base station receiver within a network for processing an Enhanced Dedicated transport Channel (E-DCH) received from a user in the network, the E-DCH having an Enhanced Dedicated Physical Data Channel (E-DPDCH) which carries the E-DCH and from which soft symbols are generated at the base station receiver, and having an Enhanced Dedicated Physical Control Channel (E-DPCCH) used to transmit control information associated with the E-DPDCH, which along with configuration information from a radio network controller (RNC) of the network enables the base station receiver to determine a reference amplitude ratio linked to the actual power offset of the E-DPDCH from a legacy DPCCH, the method comprising:

determining an estimated E-DPDCH to DPCCH amplitude ratio, and multiplying the soft symbols by the estimated amplitude ratio, to enable the soft symbols of the E-DPDCH to be processed by the log-MAP turbo decoding algorithm in the base station receiver.

8. The method of claim 7, wherein determining the estimated amplitude ratio further includes determining an initial estimated E-DPDCH to DPCCH amplitude ratio, and evaluating the initial estimated E-DPDCH to DPCCH amplitude ratio against a reference E-DPDCH to DPCCH amplitude ratio to determine a final estimated E-DPDCH to DPCCH amplitude ratio to be used in said multiplying step.

9. The method of claim 8, wherein determining the initial estimated amplitude ratio further includes:
calculating a first energy value of the E-DPDCH,
calculating a second energy value of the DPCCH,
dividing the first energy value by the second energy value to obtain an amplitude ratio, and
determining the square root of the amplitude ratio for output as the initial estimated amplitude ratio.

10. The method of claim 8, wherein
the initial and reference amplitude ratios are in dB, and
evaluating the initial estimated ratio against the reference amplitude ratio further includes
setting the final estimated amplitude ratio to be used as the scaling factor to the value of the reference amplitude ratio, if the initial estimated amplitude ratio is less than the reference amplitude ratio.

11. The method of claim 8, wherein the initial and reference amplitude ratios are in dB, and
evaluating the initial estimated ratio against the reference amplitude ratio further includes
determining if the initial estimated amplitude ratio is greater than the reference amplitude ratio plus a specified maximum offset, and if so
setting the final estimated amplitude ratio to the value of the reference amplitude ratio plus the offset, else
setting the final estimated amplitude ratio to a value equal to a difference between the initial estimated and reference amplitude ratios, rounded up to the next highest integer value, plus the value of the reference amplitude ratio.

12. The method of claim 8, wherein the reference E-DPDCH to DPCCH amplitude ratio can be inferred by the base station receiver from the E-DPCCH along with configuration information from the RNC.

* * * * *